May 16, 1961 R. T. NIESET ET AL 2,984,833
SUPER-REGENERATIVE RADIO RANGING DEVICE
Filed Dec. 16, 1948 3 Sheets-Sheet 1

INVENTORS:
Horace R. Crane
Anne C. Gratian
Joseph W. Gratian
Robert T. Nieset

United States Patent Office 2,984,833
Patented May 16, 1961

2,984,833

SUPER-REGENERATIVE RADIO RANGING DEVICE

Robert T. Nieset, New Orleans, La., Horace R. Crane, Ann Arbor, Mich., Anne C. Gratian, and Joseph W. Gratian, Rochester, N.Y., assignors to the United States of America as represented by the United States Atomic Energy Commission Filed Dec. 16, 1948, Ser. No. 65,696

7 Claims. (Cl. 343—13)

This invention relates broadly to a method and apparatus for effecting operations on a vehicle as a consequence of the approach to a selected intervening distance from another body. More particularly, it is directed to radio apparatus adapted to be carried on a vehicle for initiating a desired sequence of operations when the intervening space between the vehicle and a reflecting body is reduced to a selected value.

It is highly desirable in the operation of certain types of moving vehicles, such as aircraft for instance, that means be provided whereby the occurrence of a preselected value of proximity to the surface of the earth or other foreign body effects the actuation of warning lights or steering modifying apparatus. Other vehicles on which the provision of such equipment is desirable to avoid collision are for example, trains, ships and automobiles in order that warning devices, reversed propulsion, or brakes will be applied in the event the vehicle approaches within a selected distance from an object.

More particularly, there are certain vehicles, such as projectiles, in which the provision of apparatus for initiating a sequence of operations upon the occurrence of a preselected value of proximity to another body is a necessity. For instance, certain types of free-falling projectiles containing explosive material are most effective if detonated at a predetermined distance above the objective.

The provision of apparatus for performing the above discussed function on a vehicle is subject to certain requirements. The apparatus must possess accuracy, high sensitivity, compactness, lightness in weight and ruggedness.

A device having favorable characteristics for meeting the foregoing requirements is disclosed in copending application Serial Number 65,695 filed December 16, 1948, now abandoned. The referenced device utilizes a peculiar characteristic of the super-regenerative oscillator-detector for sensing the occurrence of the selected range.

This characteristic is the generation of noise under free running conditions of the super-regenerative oscillatory circuit; and disappearance of noise generation under the condition that externally derived excitation of proper phase is impressed on the oscillatory circuit.

The behavior of the super-regenerative oscillator in the aforementioned manner may be understood from a brief consideration of operating conditions in the device. The super-regenerative oscillator is an oscillator circuit including a thermionic tube and a resonant circuit. In the self-quenching super-regenerative circuit, the tube is provided with a grid leak of such high value that the grid bias accumulated under oscillating conditions causes blocking after an interval of oscillation. The sine wave quenched super-regenerative acts in a somewhat similar manner except that the termination of each oscillation is more precisely determined by the negative excursions of the sine wave.

After the tube is blocked and oscillations in the resonant circuit have collapsed, there is an interval of inaction during which the blocking bias on the grid is dissipated through the grid leak. After the grid potential has recovered to a value at which the building up of oscillations is again possible, the oscillations will begin, but only when the resonant circuit is given a small start. The small start may consist of either internally created thermal noise or excitation of proper phase from without. If there is no excitation from without the circuit, and the thermal noise starts the process, there results a slight indefiniteness in the instant of the beginning of each successive oscillation. It follows, that under this condition, the birth of succeeding groups of oscillations are not evenly spaced in time.

The irregular starting of succeeding oscillations under the free running condition is in marked contrast to the behavior of the oscillator when the oscillations are started by externally derived excitation of proper phase. Under the latter condition, the oscillations begin at regular intervals.

The externally derived excitation for starting such succeeding oscillation after a uniform interval from the previous oscillation may be derived by directing energy from each preceding oscillation through a path having a length such that some of the energy is returned to the circuit at the proper instant to control a succeeding oscillation.

It follows that under the condition that the super-regenerative oscillator is provided with radiating and receiving means, it is capable of indicating the occurrence of that distance between itself and a reflecting object which so phases the received echo of energy of each emitted oscillation that the intervals between oscillations become uniform.

The presence of irregularity or regularity in the occurrence of succeeding oscillations is evidenced by the fact that irregularly spaced oscillations give rise to a signal having frequencies corresponding to the irregularities. These frequencies vary and are scattered through a wide range including the audio range in such manner as to constitute a hiss or noise.

It follows that the provision of a filter for passing the noise energy, and a detector for rectifying the same results in the creation of a unidirectional current under the conditions of irregularities in oscillation generation, and a marked decrease or disappearance of the current under the condition of regularity in oscillation generation.

Therefore, the noise current is created when the device is not on range and decreases or disappears when the device is on range.

The variation in unidirectional current corresponding to ranging may be utilized to actuate current responsive devices in any way common in the art. An alternative method is the translation of the current variations into potential variations by the insertion of a resistance in the current path. The potential variations are readily applied to a potential responsive device such as a grid controlled gas discharge tube or thyratron in such manner that the relatively high potential derived from off-range conditions is applied to negatively bias the tube into a state of non-conduction. It follows that a selected decrease or disappearance of the negative bias corresponding to a condition of on-range causes the gas discharge tube to become conductive and operate any suitable current responsive device connected in series with the interelectrode space.

The ranging device of the referenced disclosure constructed in accordance with the principles set forth in the foregoing discussion receives echoes of the transmitted pulses in proper phase to reduce noise energy at the selected range and also at multiples of the selected range, and for this reason a decrease in rectified potential is obtained at the basic range and at multiples of the basic range. The reduction in noise, i.e., the decrease in rectified potential, decreases with respect to increasing multiples of the basic range at a substantially constant rate although the amount of decrease in rectified potential at all ranges depends on the amount of radiated power.

It follows that a potential responsive device adjusted to react at a selected decrease in potential corresponding to the selected range is capable of performing reliably under the condition of constant radiated power. However, in the event the radiated power varies, the amount of dip in rectified potential obtained at a multiple or submultiple of the selected range may be of sufficient magnitude to cause the potential responsive device to respond at the said multiple or submultiple of the selected range. Since the device is originally adjusted to indicate at a selected range, the indication at another range due to inadvertent changes in radiated power is a false indication.

It has been found in practice, that conditions are encountered in which the ranging device generates amounts of radiated power which vary from the amount at which the device was adjusted.

To the end that false indications will be avoided, the instant invention is directed to a system which avoids the creation of noise dips at regular multiples of the selected range. This effect is obtained by the generation of oscillatory energy in ranging pairs, with the ranging pairs separated by relatively long intervals as contrasted with the above described system in which the average interval between pulses is a constant. In accordance with this arrangement, decreases in rectified potential are obtained at only the selected range and at ranges so sufficiently removed from the basic range that false indications are easily avoided.

Therefore, it is an object of this invention to provide a simplified radio ranging device for accurately indicating a selected range irrespective of variations in radiated power.

Another object of this invention is the provision of a super-regenerative ranging device.

Still another object is the provision of a super-regenerative ranging device which is compact, rugged, and reliable in operation under extreme conditions of acceleration and vibration.

Another objective of this invention is the provision of means in a light weight ranging device for effecting selected operations in response to the diminution of intervening distance to a preselected value between the device and a foreign body.

Still another object of this invention is to provide super-regenerative apparatus adapted to generate an electric quantity in response to the occurrence of a selected intervening distance between the apparatus and an approaching body.

Another object is to provide switching means for initiating desired operations in response to the electric quantity generated by a super-regenerative device when the intervening distance between the device and a foreign body is a selected value.

Further objects and features of the invention will be more clearly understood from the following detailed description which is accompanied by a drawing in which.

In order to more easily explain the present invention, a brief description of the operation of the basic ranging system of the referenced disclosure is in order.

Figure 1:
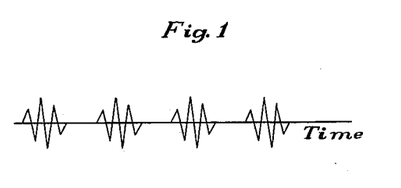
Figure 1 is a chart of radiation produced by the super-regenerative ranging device of the reference disclosure when on range.

Referring to Figure 1, the distribution of the radiation of the system of the referenced disclosure is shown. Short bursts of radiation are emitted at uniform intervals when the device is on range. The reason for this is that the echo of a preceding burst of radiation is received back at the device in proper phase to control a succeeding oscillation. When not on range, the intervals between succeeding spurts are irregular, and this phenomena gives rise to energy of noise frequencies. Therefore, as the device closes in distance between itself and a reflecing object, a series of noise dips are obtained as the device passes through those distances in which the reflection is of proper phase to control some succeeding oscillation.

Figure 2:
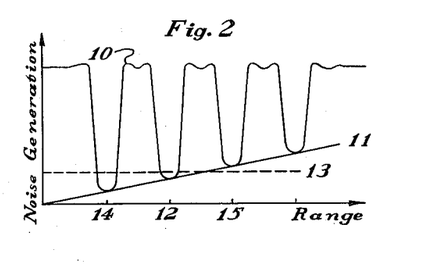
Figure 2 is a chart of rectified potential with respect to range obtained with a super-regenerative system which radiates in the manner of Figure 1.

The potential which results from rectifying the generated noise has dips as shown in Figure 2. The amount of decrease of noise depends upon the strength of the echo returned to the equipment for the reason that the strength of the echo is a factor which influences regularity in the birth of succeeding oscillations. Therefore, since the strength of the echo is a function of the amount of power radiated and the distance through which the radiated power travels, the extent of dip of rectified noise potential is likewise a function of radiated power and distance.

Under a condition of constant radiated power, the series of noise dips are obtained as shown by the curve 10 in Figure 2. It is to be noticed that the rate of decrease of succeeding noise dips is a constant as shown by the straight line 11.

It is assumed for purposes of explanation that the device is adjusted to respond at the range indicated by numeral 12. To this end, the potential responsive device which may be a thyratron is provided with suitable operating potentials such that the recified noise energy applied as a bias potential to maintain non-conduction drops below the firing line indicated by line 13.

It follows that under the conditions shown in Figure 2, that as the device closes in range toward an objective, a sufficient decrease in bias potential to permit the thyratron to fire occurs only when the device encounters selected range 12.

Therefore, under the condition of constant radiated power, the described ranging device is capable of accurately triggering the switching device as it encounters the selected range in closing in on a reflecting object.

The effect of changes in radiated power are best understood with further reference to Figure 2. In the case of reduced radiated power, the rate of decrease of the succeeding dips increases beyond that shown with the result that the generated potential at range 12, for instance, may not decrease to the selected triggering potential. The device, therefore, does not respond at this range but instead, must wait until a nearer distance such as 14 is reached, at which point the generated potential reduces to the selected triggering value. The reverse situation obtains in the event of an increase in radiated power resulting in a response, for example, at a greater distance 15 than the selected range 12. In either case, an erroneous response is obtained.

The present invention obviates the dependence between the obtained ranging indication and radiated power by an arrangement wherein pulses of radiation are generated with excess power in a sequence such that a short ranging interval occurs between each pair of ranging pulses and a relatively long interval occurs between the pairs of ranging pulses.

Figure 3:
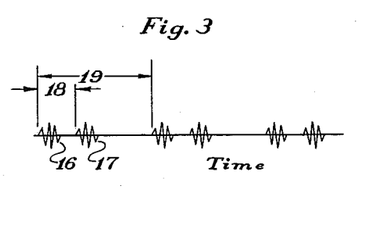
Figure 3 shows the distribution of radiation intervals with respect to time as produced in the device of the present invention.

Referring to Figure 3, a sequence of pairs of oscillations as produced in the present invention are shown. The first oscillation of each pair is indicated by the numeral 16. This burst of oscillations is termed the sending oscillation for the reason that it is radiated and it is its echo which returns in proper phase from an object at the selected range to control the creation and therefore, the regularity of the second oscillation indicated by numeral 17. Noise is generated by succeeding second oscillations 17 when the device is off-range and disappears or markedly decreases when the device is on-range. Therefore, the second burst is termed the sensing oscillation.

On range, the interval between the sending and sensing oscillations is substantially equal to the time consumed by a sending oscillation radiation in travelling to and from the reflecting object and therefore, this interval is termed the ranging interval and is denoted by the numeral 18. The interval between succeding sending oscillations is termed the repetition interval and is indicated by numeral 19.

Figure 4:
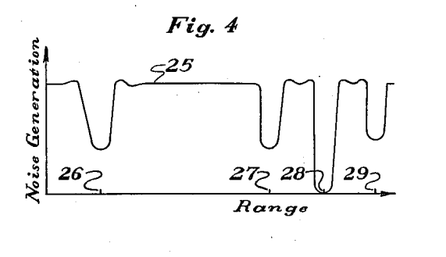
Figure 4 is a chart showing the occurrence of rectified noise dips with respect to range as obtained in one embodiment of the present invention.

Referring to Figure 4, the rectified noise potential derived from the paired oscillation system thus far described is shown by curve 25. If the randomness of the first or sending oscillation is not suppressed, the rectified noise potential at the selected range 26 drops to about one half its non-ranging value.

Additional noise dips 27, 28 and 29 are obtained at ranges which are long with respect to the selected range due to the concurrence at the device of the reflections of preceding emissions in proper time phase with instant emission. These noise dips occur at distances so far removed from the selected range that confusion with the indication of the true range is easily avoided.

Figure 5:
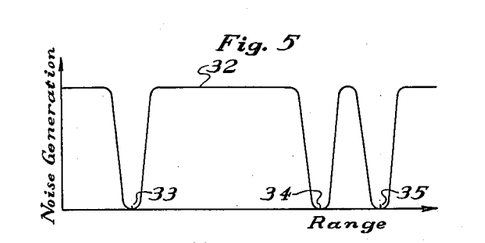
Figure 5 is a chart showing the occurrence of rectified noise dips with respect to range in the preferred embodiment of the present invention.

In order to obtain a more decisive dip in rectified noise potential at the selected range, means to be presently described are provided in the preferred embodiment to remove the randomness from the first oscillation of each ranging pair of oscillations. The only source of noise remaining is, therefore, the second oscillation of each ranging pair, and this noise is reduced to zero at the selected range. The occurrence of rectified noise potential dips created by the preferred embodiment is shown by curve 32 in Figure 5. The noise dip correponding to the selected range is shown by numeral 33. Additional dips 34 and 35 are so remote in time and distance from the selected value that their elimination presents no problem.

Figure 6:
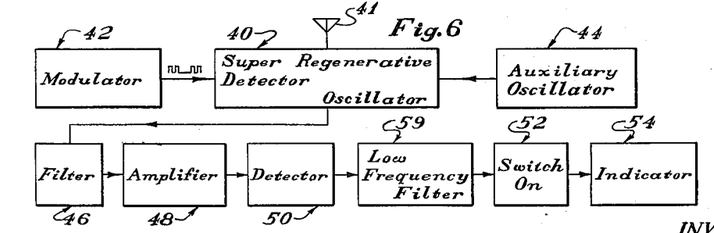
Figure 6 is a block diagram of the ranging system in the preferred embodiment.

The organization of parts in the preferred embodiment is illustrated in block form in Figure 6.

Figure 9:
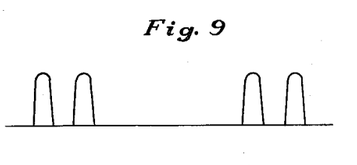
Figure 9 is a curve showing the double pulse modulation as used in the present invention for the formation of the ranging pairs of Figure 3.

The signal emitter and echo sensing device is a super-regenerative oscillator 40 having an antenna 41 coupled to the oscillatory circuit. The oscillator is triggered into oscillation by the generation by modulator 42 of modulation pulses such as shown in Figure 9 and is quenched for the intervals between.

The auxiliary oscillator 44 is coupled to the oscillator to control the regularity of the sending pulses to thereby eliminate the generation of noise by the sending pulses.

To the end that a desired indication or operation can be obtained by the ranging device, the noise energy generated by irregularity in starting of the receiving oscillations is passed through filter 46, processed in amplifier 48 and rectified in detector 50. A unidirectional positive going potential is derived from the detector when on range and is impressed through low frequency filter 59 on a potential responsive switching unit 52 in order to actuate indicator 54.

The ranging device of the present invention will now be described in detail and to the end that a succinct description of the several components will be obtained, the components are taken up in the order written in the preceding paragraphs.

The super-regenerative detector-oscillator

Figure 7:
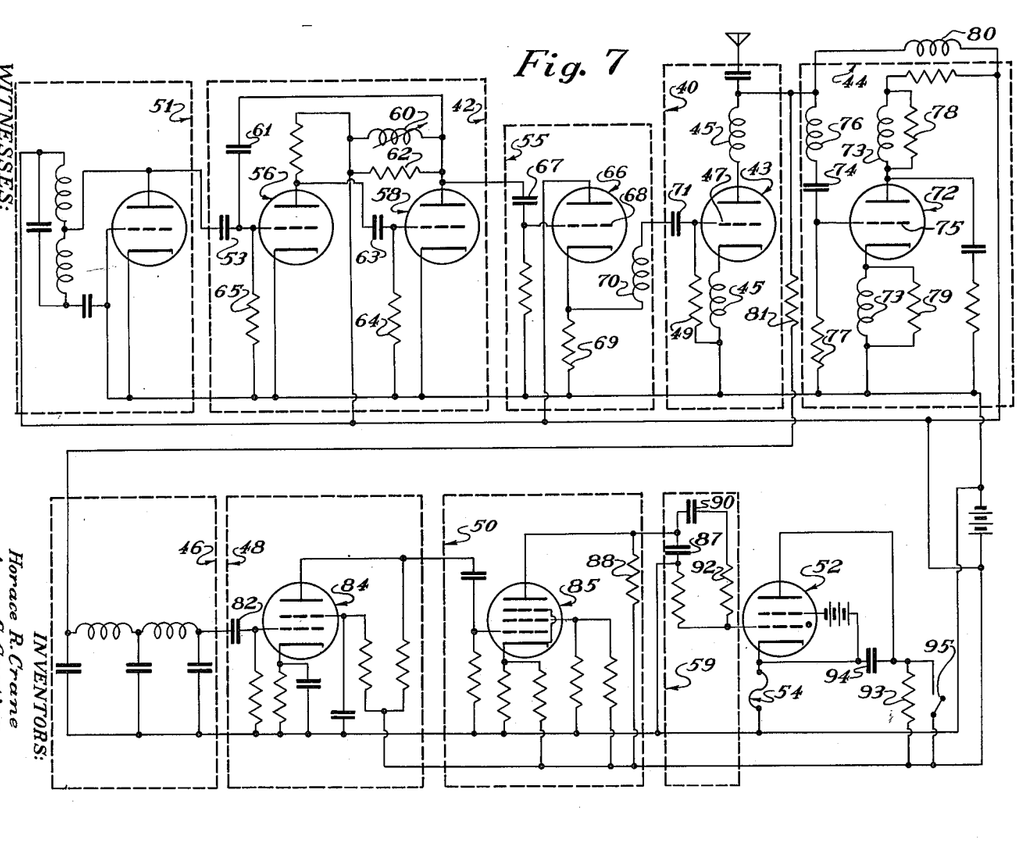
Figure 7 is a schematic diagram of the circuits in the preferred embodiment.

Referring to Figure 7, the super-regenerative detector-oscillator hereinafter termed the power oscillator for purposes of brevity is indicated generally by numeral 40. The power oscillator utilizes a triod 43 in an oscillatory circuit of the Colpitts type. Tank inductances 45 are connected in the cathode and anode circuits and are proportioned in accordance with the selected working frequency. The grid 47 is provided with a grid leak resistance 49 and modulation input coupling condenser 71.

Positive pulses are derived from the modulator 42 and are impressed on the grid input coupling condenser. Under the influence of the positive pulses, grid rectification takes place and provides the negative bias necessary to keep the oscillator tube 43 well below cut-off during the intervals between modulation pulses. To this end, the product of the grid resistance 49 and coupling condenser 71 is proportioned to provide a time constant somewhat longer than the repetition interval.

The power oscillator is released to start each oscillation by the cancellation of the negative grid bias by a positive modulation pulse, and is abruptly stopped at the termination of the modulation pulse by the high negative charge accumulated on the grid in the manner previously described.

For example, a 955 type triode utilized as an oscillation generator has a value of cut-off bias equal to approximately minus 22 volts under a condition of 250 volts on the anode. To stop the oscillator abruptly, the grid is impressed with a bias which is approximately 10 volts more negative than the cut-off value. To permit the start of an oscillation, the bias must be reduced to zero substantially. Under these conditions, the modulator pulses are required to have a peak value in the neighborhood of 35 volts positive. If the modulation pulses attain a higher value of positive peak voltage than that required, the power oscillator grid draws more grid current and automatically increases the grid bias. On the other hand, the modulation pulses must not be equal to or less than a minimum value which is approximately 35 volts in the above example for the reason that eratic starting and quenching of the power oscillator is the consequence.

The ranging ability of the device for short ranges is dependent on certain circuit characteristics. For instance, the circuit is necessarily arranged so that the oscillatory condition incident to sending a signal toward an object will have disappeared and a sensing or receiving condition prevail at the time the echo is received. Therefore, the duration of the sending oscillation and the ranging interval are essential characteristics which determine the shortest range to which the device can respond.

The duration of the sending oscillation depends on the time of oscillation build up, the period of oscillation at constant amplitude and the time of decay of the oscillation down to thermal noise level. The duration of oscillation at constant amplitude is controllable by selection of the modulation pulse length and can be reduced to very nearly zero. Therefore, the minmum oscillation duration is determined by the time of build-up and of decay.

Figure 11:
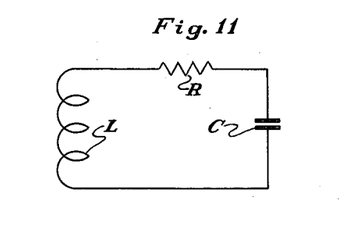
Figure 11 is a schematic representation of the super-regenerative circuit in simplified form.

A discussion of the duration of build-up and decay of oscillations is expedited by reference to the simplified equivalent circuit shown in Figure 11. The inductance and capacitance of the oscillatory circuit is indicated by L and C respectively. R is the sum of all resistive components reflected into the oscillator tank and the tank resistance itself. The super-regenerative circuit may be defined as the oscillator shown in which R varies from a negative to a positive value. The oscillations in the circuit build up when R is negative, maintain constant amplitude when R is zero, and decay when R is positive. During the time the oscillator is quenched, that is, during the condition of cut-off grid bias, R is constant and equal to the conductor and radiation resistance only.

The decay of the voltage across C may be written $$E_c = E_0 e^{-\frac{RT}{2L}} \quad (1)$$

where $E_c$ is the instantaneous voltage across the condenser, $E_0$ is the maximum voltage prevailing at the beginning of decay and T is the instantaneous time measured from the instant of beginning of decay.

In terms of circuit Q the above equation becomes $$E_c = E_0 e^{-\frac{\pi f}{Q} t} \quad (2)$$

where $t$ is the natural frequency of the circuit.

When the oscillator is conditioned for oscillation by a positive modulation pulse, the oscillation starts on thermal noise. Owing to regenerative action, R is negative in value with the result that oscillations grow at a rate determined mainly by the Q value of the circuit. However, since the circuit losses increase as the amplitude of oscillations increase, the oscillations quickly reach maximum amplitude. Upon the removal of the positive modulation pulse, R becomes positive and the voltage across C decays in accordance with the above written equation.

From the foregoing considerations, a guide for the selection of characteristics of the circuit suitable for operation on a selected range can be determined.

The ranging interval $T_r$ is correlated to the distance of ranging in accordance with the relation $$T_r = \frac{2D \text{ max}}{C} \quad (3)$$

wherein D max is the maximum distance at which ranging occurs and C equals the velocity of light. Accordingly, the ranging interval is directly determined from the selection of the range to be indicated.

The shortest ranging interval for the circuit must be at least equal to the duration of the sending pulse plus the time consumed by the energy in the oscillatory circuit to decay to below the thermal noise level.

The decay time in terms of circuit Q is derived from Equation 2 in which the initial voltage is denoted by E max and the final voltage is denoted by E noise.

$$t = \frac{Q}{\pi f} \log \frac{E \text{ max}}{E \text{ noise}}$$

Therefore, if the length of the sending pulse is denoted by $t_s$ the relation between the ranging interval and the circuit parameters is stated thus:

$$T_r = \frac{2D \text{ max}}{C} > \frac{Q}{\pi f} \log \frac{E \text{ max}}{E \text{ noise}} + t_s$$

The application of the principles above set forth are herewith applied to a practical example. It is desired that the device range at 150 feet under the conditions of an E max equal to 100 volts, a Q of 50, a thermal noise level of 50 microvolts and a working frequency of 700 megacycles.

Figure 10:
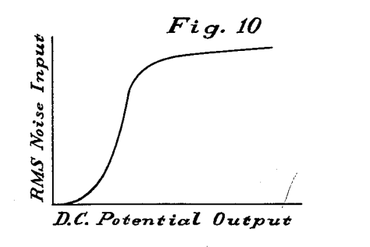
Figure 10 is a diagrammatic showing of the characteristics of a detector used in the invention.

Thermal noise voltage for a circuit having a single degree of freedom such as shown in Figure 10 can be determined from the equation: $V^2 = KT/C$ where V is the root mean square noise voltage, K is Boltzmanns constant $1.37 \times 10^{-28}$ Joules per degree absolute, T is the absolute temperature in degrees Kelvin, and C is the capacitance.

$T_r$ is therefore $\frac{300}{5280 \times 186 \times 10^3} = .305$ microsecond

The decay time $t_d$ of the circuit is $$t_d = \frac{50}{\pi \times 700 \times 10^6} \log \frac{100}{50 \times 10^{-6}} = .152 \text{ microsecond}$$

The pulse length can therefore be selected equal to a value of .153 microsecond although a value such as .1 microsecond is preferred in order to insure ample time for the oscillatory circuit to become quiescent by the time it is to sense an echo.

The length of the receiving oscillation is not critical. That part of the oscillation which continues after the oscillation reaches full amplitude contributes nothing to the sensitivity of the device. It is, therefore, expedient to produce the sensing oscillations by modulation pulses of the same character as used to produce the sending oscillations and in the preferred embodiment this is done.

The interval between repeated pairs of sending and sensing oscillations is chosen so that the noise dips which occur at other than the selected range are so far removed in time from the noise dip of the selected range that a distinction can be easily made. It is found that a suitable repetition interval is about ten to twenty times as long as the ranging interval. For example, if a vehicle such as a fast airplane has a speed of 650 miles per hour and it is desired that the selected range indication occur at 500 feet from an approached object, the selected durations for the ranging and repetition intervals are chosen to be 1.02 and 20 microseconds respectively. These values cause the unwanted noise dip to occur approximately ten seconds before the desired indication, and this is a sufficient length of time to permit the distinction to be easily made.

*The modulator*

To the end that the pulses of each pair are generated with a separation in time equal to the ranging interval and succeeding pairs of pulses are separated by the repetition interval, an assymmetrical multi-vibrator 42 is provided. A pair of tubes 56 and 58 are connected in a multi-vibrator circuit of the crossed coupled anode-grid coupled type. Tube 58 is provided with anode potential through an inductance 60 in shunt with a resistance 62 for reasons presently to become apparent.

Figure 8:
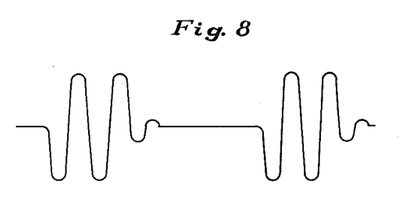
Figure 8 is a curve of wave generation produced by a component of the double pulse modulator.

Operation of the multi-vibrator is described with a first assumed condition in which a negative pulse is impressed on the grid of tube 56 resulting in a positive pulse on the grid of tube 58 thereby transferring conduction to tube 58. The resulting positive back swing of voltage developed across inductance 60 is coupled through condenser 61 back to the grid of tube 56. Condenser 61 is small in value so that it charges to nearly the full A.C. voltage developed across inductance 60 through the comparatively small grid-cathode resistance of tube 56 when it conducts. When the grid of tube 56 is positive, rectification takes place so that even a small negative swing of inductance 60 cuts off the current of tube 56 and puts another positive kick on the grid of tube 58 so that anode current again flows producing a second large swing of voltage across inductance 60. Each time the grid of tube 58 swings positive, it also rectifies and charges condenser 63. Condenser 63 can discharge only slowly through resistance 64. Therefore, on the second swing, condenser 63 becomes charged to a voltage sufficient to bias tube 58 low enough that the cycle cannot be repeated until the charge is dissipated through resistance 64. The output at the anode of tube 58 is shown in Figure 8.

The time constants of the multi-vibrator are determined primarily by inductance 60, condensers 63 and 61, and resistances 64 and 65. The rate at which inductance 60 swings determines the width of the pulses and, to some extent, the separation between the sending and sensing modulation pulses. Therefore, condenser 61 is chosen to be of a value such that it charges to nearly full capacity on the grid current of tube 56 in a length of time approximately equal to the period of the inductance 60. Resistance 65 is chosen of a value sufficient to hold condenser 61 from appreciably dropping its potential over the same interval.

The time constant of condenser 63 and resistance 64 determines the repetition rate and the value of condenser 63 is chosen to limit inductance 60 to two swings. Condenser 63 is chosen small enough to charge appreciably on the peaks of both the sending and sensing modulation pulses and the voltage to which it is charged must be appreciably greater at the end of the sensing pulse than at the end of the first pulse so that tube 58 becomes biassed so low that the cycle cannot be repeated until condenser 63 discharges through resistor 64.

Resistance 64 is of a value to hold the bias of tube 58 below cut-off for the interval between the repetition of the double pulse.

Plate inductance 60 is damped by means of shunt resistance 62 in order to limit the number of times a swinging voltage is developed therein each time the circuit is triggered. Inductance 60 is adjustable in order to permit the ranging interval to be adjusted.

The damping of inductance 60 is related to the time constant of resistance 65 and condenser 61 as well as to the rate of charging of condenser 63 through the grid of tube 58 in determining the number of times inductance 60 swings each time the circuit is triggered. The decriment of inductance 60 should be about .1 as this is approximately the ratio of the second pulse to the unwanted small third swing.

An example of the determination of circuit constants for a multi-vibrator having a free running repetition interval of 100 microseconds is as follows:

$$\frac{\pi}{Q} = \log 10 \qquad Q = \frac{\pi}{2.3} = 1.4$$

This relation, when the damping is high, is only a rough indication of the value of Q but it serves as an approximation.

Inductance 60 is assumed to have a value of 2.5 millihenry and a natural frequency of 800 kilocycles thus determining a pulse width and pulse spacing of slightly more than .5 microsecond.

$$Q = \frac{2\pi \times 2.5 \times 10^{-3} \times 8 \times 10^5}{R}$$

and since $$Q = 1.4$$

$$R = \frac{2\pi \times 2 \times 10^3}{1.4} = 8000 \text{ ohms}$$

Therefore, under the assumed conditions, a shunt resistance of 8000 ohms is suited to limit the number of oscillations to two in which the pulse width is .5 microsecond and the pulse spacing has the same duration.

It is found that proportioning the time constant of condenser 61 and resistance 65 short with respect to the period of inductance 60 renders the damping less critical. A ratio of 1/10 is suitable. Also, the time constant of the product of condenser 63 and the resistance between grid and cathode of tube 58 is preferably made shorter than the period of inductance 60 in order to make the damping less critical.

Resistance 64 is made large enough to give the product of condenser 63 and resistance 64 a value equal to the desired repetition interval in seconds.

The circuit as described under free running conditions repeats at about 100 microsecond intervals. It has been found that the use of impressed stimuli at 20 microsecond intervals makes for greater regularity in timing. To this end, a timing oscillator is provided.

The timing oscillator

In order to obtain greater regularity in timing than a free running multi-vibrator provides, timing oscillator 51 is coupled to the multi-vibrator through a small capacitance 53. The frequency of the timing oscillator is such as to drive the multi-vibrator at a faster than free running rate. For instance, if the multi-vibrator under a free running condition repeats at about 100 microsecond intervals, the timing oscillator is given a frequency such as to cause the multi-vibrator to repeat at 20 microsecond intervals.

The timing oscillator 51 is shown as a series-fed Hartley circuit although any well known oscillatory circuit may be used. The coupling condenser 53 is very small, of the order of 3 micromicrofarads, in order that the time constants of the multi-vibrator are not altered by too close coupling thereto of the timing oscillator circuit. Further, the use of a small coupling condenser connected to the plate of the timing oscillator results in the multi-vibrator being triggered by a harmonic of the timing oscillator output which gives a sharper triggering time than obtainable by the use of the fundamental.

Thus far the modulator has been described as an asymmetrical multi-vibrator timed by a timing oscillator. To the end that the modulating potentials will be rectified and impressed on the radio frequency oscillator, a coupling stage 55 is provided.

The modulator coupler

The output signal of the multi-vibrator is spaced pairs of alternating oscillations in the form shown in Figure 8. In order to trigger the power oscillator, the oscillations must be translated into unidirectional pulses. To this end, thermionic tube 66 is provided. The oscillatory energy of the multi-vibrator is impressed on grid 68 by means of coupling condenser 67. The tube is so biassed by an appropriate value of cathode resistor 69 that no-signal operation is substantially at cut-off. Therefore, as shown in Figure 9, only positive pulses corresponding to the positive peaks of the applied oscillations appear across the cathode resistor. Connection is made to the cathode of tube 66 in the manner of a cathode follower to make available the positive modulation pulses for application to the power oscillator.

The output of the cathode follower is coupled to the grid of the radio frequency oscillator through a radio frequency blocking inductance 70. The radio frequency oscillator is turned on and off by the modulator. The positive pulses drive the grid positive and the resulting grid rectification provides bias which keeps the oscillator well below cut-off for the intervals between pulses. This requires that the grid coupling condenser 71 and grid leak 49 have a time constant slightly longer than the repetition interval.

The modulator impresses pairs of positive pulses repeated at the repetition interval on the radio frequency oscillator. The first radio frequency pulse is not affected by the receipt of echoes at the selected range so that noise accompanying the generation of the first pulses of each pair of pulses is not suppressed by echoes.

To the end that noise will not be produced by the first oscillation of each pair, regularity in the starting of the first oscillation is obtained by impressing starting stimuli on the oscillatory circuit by means of auxiliary oscillator 44.

The auxiliary oscillator

The auxiliary oscillator comprises a wave generator, including tube 72 and tank inductances 73. The oscillatory energy of the auxiliary oscillator is impressed on the power oscillator tank circuit by means of small condenser 74 connected between grid 75 and the power oscillator tank circuit.

The auxiliary oscillator is adapted to generate wave energy having a frequency slightly different from that of the power oscillator. This difference in frequency is to prevent interlocking between the two oscillators so that interference with the sensing oscillation is avoided.

The auxiliary oscillator is effective in starting only the first pulse of the radio frequency oscillator. The reason for this is during the transmitting oscillation of the power oscillator, the anode potential is driven downward so that a negative pulse is coupled to the grid of the auxiliary oscillator. As a result, the auxiliary oscillator is blocked while the power oscillator is generating the sending oscillation. In order to obtain reliability in starting the power oscillator by the auxiliary oscillator, it is desirable to delay the blocking of the auxiliary oscillator for a short interval after the power oscillator starts to generate the sending oscillation. To this end, inductance 76 is inserted in series in the coupling circuit. Suitable values for these parts are one millihenry for inductance 76 and 2000 micromicrofarads for condenser 74.

The delay circuit comprising inductance 76 and condenser 74 has a tendency to cause the auxiliary oscillator to self-oscillate intermittently at high plate voltages. This tendency is overcome by the use of a low value grid leak 77 and tank coil loading resistors 78 and 79.

It was previously stated that the first pulse of each pair of power oscillator pulses, that is, the transmitting pulse, causes the auxiliary oscillator to become blocked. The plate dip of the power oscillator which produces this result lasts during the production of both the transmitting and receiving oscillations because of the load inductance 80 in the power oscllator plate circuit. The negative dip, therefore, holds the auxiliary oscillator out of oscillation until the receiving or second pulse of the power oscillator is over. Oscillation is resumed by the auxiliary oscillator during the repetition interval, that is, before the next transmission pulse.

*The noise selective filter*

The indicating characteristic of the subject ranging device is derived from variations in the power oscillator plate current. These variations in current are translated into voltage fluctuations across anode power supply inductance 80. It is advantageous to utilize noise frequencies which are within a band limited on the low end to approximately 5000 cycles and on the upper end to approximately ¼ the repetition frequency. The reason for these values is the advantage which flows from the avoidance of low frequencies microphonic noises on the lower end, and interference from the quench frequency on the upper end. To the end that microphonic noise energy will be attenuated, the anode power supply inductance 80 is proportioned to have a low impedance below 5000 cycles.

To the end that noise voltage fluctuations will be precessed without interference from energy of the quench frequency, the same are passed through low-pass quench filter 46. Interaction between circuit elements in the power oscillator and the tuned filer is avoided by the use of resistance 81 inserted in series between the filter and the power oscillator.

The quench filter comprises two π sections and is designed to pass energy having frequencies below ¼ the repetition frequency and to attenuate by 60 decibels, energy having frequencies in the vicinity of the quench frequency. The input and output impedance is proportioned in accordance with principles well known in the art to match the output impedance of the power oscillator. The output of the filter is taken from coupling condenser 82 and thereby coupled into amplifier 48.

*The amplifier*

The output of the filter is coupled through condenser 82 to the grid of amplifier tube 84. The input impedance of the amplifier circuit is given a high value compared to the filter output impedance with the result that a rise in amplification is obtained in the middle of the band pass.

The amplifier generally is of the well known resistance capacitance coupled type. Limitation of the pass band is accomplished by selection of the input and output time constants, and the time constants of the screen grid and cathode circuits. The constants in the preferred embodiment in which the repetition frequency is 64,000 cycles were chosen to boost the gain at 14,000 cycles and to reduce the voltage gain to 70% at 5000 cycles and 45,000 cycles.

The amplified noise energy present in the amplifier output is impressed on detector 50 to generate a unidirectional potential of relatively constant value except when the device is on range.

*The Detector*

The noise output of amplifier 48 is rectified by plate detection. The detector tube 85 is preferably of the pentode type in order that appreciable gain is obtained. It is desired that the detector together with suitable circuit elements create a constant output voltage over a wide range of input energy level. To this end, the anode load resistor is of high value in order to provide current limiting. The control grid bias and screen grid potential are selected to assist in the attainment of non-linearity in operation.

The preferred characteristic of the detector tube as obtained from the foregoing described arrangement is shown in Figure 10.

The use of the non-linear operation of the detector causes it to saturate at low input voltage thereby rendering the output potential constant for all values of noise level over a threshold value. Therefore, the device is reliably independent of fluctuations among which may be variations in power output and fluctuations in amplitude of received signal. When not on range, the full detector output is obtained and when on range, the output drops to zero.

*The low frequency filter*

A low frequency blocking resistance capacity filter 59 is provided to couple the output of the detector to the thyratron switching device. This filter comprises a by-pass condenser 87 in shunt with the parallel impedance plate resistance and plate load resistor 88. The constants of this filter are proportioned in accordance with the length of time, $t_h$, consumed by the vehicle in passing through a noise dip. The low frequency fluctuations of frequency due to passage through a noise dip are equal substantially to $1/t_h$. These fluctuations must be kept small compared to the change in rectified noise which occurs upon ranging in order to have the thyratron safe against accidental firing. Therefore, the resistance 88 and capacitance 87 of the filter are selected of a size that a voltage attenuation factor of .7 is obtained at $t_h$. The low side of the band pass is attenuated to .7 at 1 cycle by coupling condenser 90 and thyratron grid resistor 92.

*The switching circuit*

The output of the detector is coupled to a switching circuit 52 which in the preferred embodiment is a thyratron. The signal input at the detector disappears under the on-range condition; therefore, the potential at the anode swings positive in value. This positive swing of potential, or positive pulse, is coupled to the grid of the thyratron by coupling condenser 90. It is desirable that a large positive pulse be required to fire the thyratron. To this end, the electrodes are supplied with appropriate potentials. For example, in the use of the type 2D21 tetrode, the shield grid is biassed minus six volts, and the control grid is returned to the cathode through grid resistance 92. This arrangement requires a positive pulse having a peak value of approximately 45 volts at the thyratron grid to fire it.

The thyratron is protected from current overload by a series anode resistor 93 and condenser 94. This arrangement enables the circuit to relax if fired prematurely as the unit heats up or in passing through the aforementioned higher range noise dips. Switch 95 is provided to short circuit the anode resistor after the device has passed the outer ranging noise dips. The closing of switch 95 may be accomplished by manual means at the appropriate time, or by any appropriate known type of timing mechanism.

The receipt of signals reflected from an object at the proper distance is therefore evidenced by the sudden occurrence of current in the cathode-anode circuit of the thyratron. To the end that this occurrence of current results in desired operations, a current responsive indicator may be inserted in the cathode-anode circuit. In the embodiment of Figure 7, a squib such as used for detonating explosives is indicated by numeral 54.

The above described switching circuit is activated upon the occurrence of the on-range condition and remains in the activated condition until the cathode-anode circuit is interrupted. In the case of a detonating fuse or squib, the circuit is automatically opened by the functioning of the fuse or squib. However, in the event the device is an alarm, relay actuating coil or other continuous load, it is desirable to limit the closed circuit duration of the switch circuit.

Figure 12:
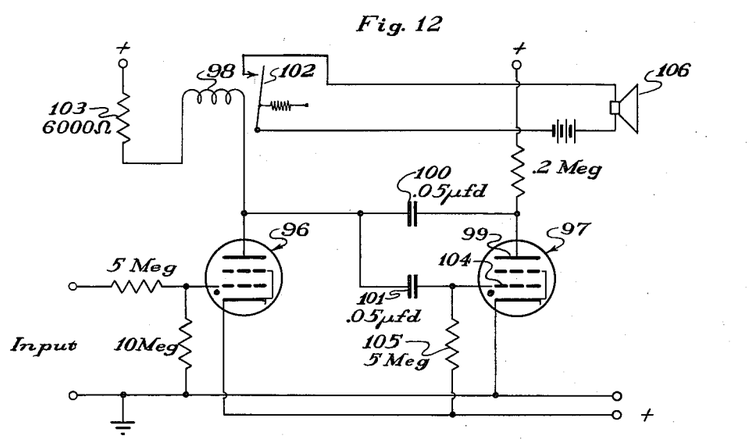
Figure 12 is a schematic representation of a switching circuit.

To the end that the indicating circuit will be activated for a selected duration, an alternative switching embodiment is shown in Figure 12. A pair of thyratrons 96 and 97 are arranged in a trigger circuit. Input thyratron 96 is provided with a positive bias on its cathode so that it is normally non-conducting. Thyratron 97 is provided with energizing potentials such that it is normally conducting. An input pulse of amplitude exceeding the cathode bias causes thyratron 96 to fire thereby actuating relay coil 98 in the anode circuit. The resistance of the actuating coil plus that of resistor 103 results in a negative going pulse at the anode at the instant the thyratron becomes conductive. This negative pulse is coupled to the anode 99 and grid 104 of thyratron 97 by condensers 100 and 101 respectively thereby extinguishing the same. A high resistance grid leak 105 permits the grid 104 of tube 97 to return to firing potential after an interval determined by the values of condenser 101 and grid resistor 105. In the embodiment of Figure 12, the values of the circuit elements are selected to result in an interval of one-half second. The firing of tube 97 after the selected interval results in a negative pulse at its anode. This negative pulse is transferred to the anode of tube 96 through coupling condenser 100 and effects the extinction of continuity through tube 96. The relay actuating coil is thereby de-energized and the relay contacts 102 open. The alarm 106 is, therefore, energized for a period which is determined by the constants of circuit elements 101 and 105. The circuit elements are shown in the drawing as fixed in value corresponding to the selected alarm interval of one-half second although the invention is not limited to the use of fixed values but obviously may use parts which are selectively adjustable so that the duration of alarm activation can be selected.

Although the invention has been described with reference to certain specific embodiments, other modifications are possible. Therefore, the invention is to be restricted only by the appended claims, as interpreted in view of the prior art.

What is claimed is:

1. In a radio ranging device, a super-regenerative circuit adapted to continuously repeat a first and a second operational phase after a repetiton interval, said first operational phase being a short period of oscillation and said second operational phase being a second short period of oscillation, said first and second operational phase being regular in occurrence under the condition that wave energy of proper phase is impressed on the circuit and irregular in occurrence under the condition of free running, wave energy generating means coupled to said circuit to impress wave energy thereon only during the first operational phase to establish regularity therein; an antenna coupled to said circuit whereby the receipt of energy of proper phase effects regularity in the second operational phase, a band-pass filter coupled to said circuit adapted to pass energy derived from irregularity in occurrence of the second operational phase, a detector coupled to said filter whereby a unidirectional current is created under the condition of absence of received energy of proper phase, the amplitude of said current decreasing to a small value under the condition of received energy of proper phase.

2. In a radio ranging device, a super-regenerative circuit having a sequence of operation in which a radiating phase of short duration is followed by a sensing phase after a duration approximately equal to twice the distance of the selected range divided by the velocity of light, and said radiating and sensing phases are repeated after an interval of from ten to twenty times the first mentioned duration, said super-regenerative circuit being adapted to generate wave energy of irregular durations in the absence of impressed controlling wave energy for initiating the generation of wave energy in each phase, means coupled to said circuit for impressing controlling wave energy only on the radiating phase, rectifier means coupled to said circuit for creating a unidirectional potential from irregularities in duration of the sensing phase, whereby said unidirectional potential is created when the device is not on-range and decreases to a small value under the receipt of echoes of the radiating phase reflected from an object at the selected range, a thyratron having an inter-electrode space and at least a cathode, an anode and a grid, means for impressing operating potentials in series with the inter-electrode space, means for impressing a bias on said grid with respect to the cathode such that a normal condition of non-conduction is obtained, an indicator in series with said inter-electrode space and means for impressing said unidirectional potential on said grid whereby the thyratron fires on condition of on-range, and thereby causes the operation of the indicator.

3. In a radio ranging device, a super-regenerative circuit, means coupled to said circuit to render it normally quiescent, modulator means coupled to said circuit adapted to cause first and second activations of the same for short durations, said activations being spaced apart alternately by short and long intervals, said super-regenerative circuit being adapted to initiate the generation of wave energy at unequal intervals from the instant of application of the modulator activations in the free-running condition, local oscillatory means coupled to said super-regenerative circuit and adapted to impress thereon energy to start the generation of wave energy at substantially constant intervals from the instants of the said first activation only, antenna means coupled to said circuit whereby the receipt of wave energy of a preceding activation by reflection from an object at the selected range initiates the generation of energy of the said second activation at equal intervals from the instant of the second activations, detector means coupled to said super-regenerative circuit whereby a unidirectional potential is created when the device is not on-range and said potential undergoes a negative time rate of change as the device passes through the selected range, means for translating said negative time rate of change of potential to a positive growing potential and impressing the same on a potential responsive switching device which thereby indicates the condition of on-range when said positive growing potential reaches a selected value.

4. In a radio ranging device, a super-regenerative detector-oscillator, means coupled to said oscillator to render it normally quiescent, modulator means for neutralizing the effect of the first and second short durations, said oscillator being adapted to initiate oscillations at irregular intervals from the instants of neutralization by the first means except upon the impression upon said circuit of wave energy substantially immediately after each neutralization, means for impressing wave energy on the oscillator for the first durations only, an antenna coupled to said circuit, whereby the receipt immediately after the neutralization for the second durations of energy created in the said first durations delayed by passage to and from an object at the ranging distance causes the said oscillations of the second durations to become regular, mean for rectifying the second oscillations, means coupled to said detector-oscillator for filtering and passing only the component of energy corresponding to the irregularity in oscillations of the second durations, rectifier means coupled to said means for generating a unidirectional potential corresponding to the irregularity in oscillations, means for translating a decrease in said potenial into a positive going potential, switch means responsive to a selected value of positive potential coupled to said rectifier means and to an indicator, whereby a translated positive potential of selected value corresponding to the on-range condition causes said switch means to establish an energization circuit for said indicator.

5. In combination, a super-regenerative circuit for radiating short bursts of radiant energy with intervening alternately short and long intervals, a modulator for activating said super-regenerative circuit adapted to generate unidirectional pulses with corresponding intervening alternately short and long intervals, said modulator comprising a multi-vibrator having first and second grid controlled vacuum tubes each having at least a cathode, a grid, and an anode, a capacitor connected between the grid of the second tube and the anode of the first tube, a resistance connecting the anode of the said first tube to a source of positive anode potential and an inductance connecting the anode of the second tube to a source of positive potential, a condenser connected between the grid of the first vacuum tube and the anode of the second vacuum tube, whereby the time rate of change of anode current of the second tube passing through said inductance causes said multi-vibrator to multiple-mode with a frequency equal approximately to the natural frequency of said inductance.

6. In combination, a super-regenerative circuit adapted to generate short bursts of wave energy with intervening alternately short and long intervals, a modulator for activating said super-regenerative circuit comprising an oscillator adapted to generate a pair of oscillations, each oscillation having a half period equal to the said intervening short interval, said oscillator having a pair of vacuum tubes each having at least a cathode, a grid and an anode, a capacitor connected between the grid of the first tube and the anode of the second tube, a resistance connected between the anode of the first tube and a source of positive anode potential, a capacitance connected between the anode of the first tube and the grid of the second tube, an inductance having a resistance in shunt therewith connected between the anode of the second tube nad a source of positive anode potential, said inductance being adapted to generate potentials at its natural period in response to change in anode current of the said second tube, said potentials being impressed on the grid of the first tube whereby said oscillator is caused to generate oscillations having a period equal to the period of said inductance, said inductance with said resistance connected in shunt therewith having a decrement of approximately .1 whereby the oscillations of said oscillator are severely damped after the second oscillation.

7. In combination with a radioranging device, a switching circuit and an indicator, said ranging device being adapted to create a positive going potential upon the occurrence of the selected range, said switching device being adapted to switch on said indicator for a selected interval in response to the occurrence of a selected value of said positive going potential, said switch having a first and a second thyratron each having at least a cathode, a grid and an anode, a resistance connected between the anode of the second thyratron and a source of positive anode potential, a capacitor connected between the anode of the first thyratron and the grid of the second thyratron, means for impressing a negative bias on the grid of the first thyratron whereby it is normally non-conducting and a positive bias on the grid of the second thyratron whereby it is normally conducting, a switch actuating winding and a resistance in series therewith connecting the anode of the first thyratron to a source of positive anode potential, a condenser connecting the grid of the first thyratron to the anode of the second thyratron, means for impressing said ranging device positive going potential on the grid of the first thyratron whereby said first thyratron becomes conductive and actuates said relay and extinguishes the second thyratron, and said second thyratron becomes conductive after a selected lapse of time as determined by the value of the capacitor and grid leak connected to the grid of the second thyratron thereby extinguishing the first thyratron and inactivating the relay, said indicator being connected to a source of power and said switch, whereby an indication is obtained for the period of conduction of the first thyratron.

References Cited in the file of this patent

UNITED STATES PATENTS

| | | |
|---|---|---|
| 2,159,493 | Wright | May 23, 1939 |
| 2,265,868 | Schonland | Dec. 9, 1941 |
| 2,415,093 | Gerwin | Feb. 4, 1947 |
| 2,422,382 | Winchel | June 17, 1947 |
| 2,426,205 | Grieg et al. | Aug. 26, 1947 |
| 2,431,344 | Reeves | Nov. 25, 1947 |
| 2,452,549 | Cleeton | Nov. 2, 1948 |
| 2,511,409 | Mayberry | June 13, 1950 |
| 2,553,018 | Strafford | May 15, 1951 |
| 2,568,265 | Alvarez | Sept. 18, 1951 |

FOREIGN PATENTS

| | | |
|---|---|---|
| 581,982 | Great Britain | Oct. 31, 1946 |